United States Patent [19]

Tickle et al.

[11] Patent Number: 4,776,439
[45] Date of Patent: Oct. 11, 1988

[54] DISC BRAKES

[75] Inventors: Colin J. F. Tickle, Rossett; David F. Russell, Hoole; John Adamson, Heswall, all of England

[73] Assignee: Lucas Industries public limited company, Birmingham, England

[21] Appl. No.: 38,247

[22] Filed: Apr. 14, 1987

[30] Foreign Application Priority Data

Apr. 19, 1986 [GB] United Kingdom ............... 8609640

[51] Int. Cl.⁴ .............................................. F16D 65/54
[52] U.S. Cl. ................................... 188/71.8; 188/72.6; 188/200
[58] Field of Search ................. 188/71.1, 71.8, 72.6, 188/72.9, 79.5 GE, 79.5 GT, 196 R, 196 B, 59

[56] References Cited

U.S. PATENT DOCUMENTS

| 2,522,181 | 9/1950 | Krikorian | 188/196 B X |
| 2,904,137 | 9/1959 | Reisch | 188/196 B |
| 3,122,218 | 2/1964 | Parton | 188/72.9 X |
| 3,122,219 | 2/1964 | Altherr | 188/59 |

FOREIGN PATENT DOCUMENTS 2143152 3/1973 Fed. Rep. of Germany ..... 188/72.9

Primary Examiner—Duane A. Reger
Attorney, Agent, or Firm—Scrivener and Clarke

[57] ABSTRACT

The present invention relates to a disc brake having a lever-type caliper, suitable for use on railway vehicles. The lever caliper type disc brake comprises a pair of pivotally mounted lever arms with an actuator arranged to act between said lever arms to cause the lever arms to pivot and apply the brake. An adjustable pad positioning device is connected to one lever arm to limit the available pivotal movement for said one lever arm when said actuator is in a brakes released position. The adjustable pad positioning device thus restricts the available movement for said one lever arm when the actuator is in the brakes released position so that the pad carried by said one lever arm is always held at a defined distance from the rotating disc in the brakes released position.

9 Claims, 1 Drawing Sheet

DISC BRAKES

DESCRIPTION

The present invention relates to a disc brake.

In particular the present invention relates to a disc brake having a lever-type caliper, suitable for use on railway vehicles. In such lever type calipers each brake pad is supported on one end region of a pivotally mounted lever, the other end region of each lever being connected to an actuator. In operation the actuator forces said other end regions of the levers apart to apply the pads, one to each side of a rotating disc. However, disc brakes of the lever caliper type when used with high speed discs mounted, for example, on a drive element of a vehicle, have a disadvantage in that shock and vibration accelerations, and friction, may cause the brake pads to contact the disc when the brake is in a released state. Futhermore, in cases when the axis of the disc is not horizontal, for example on an inclined drive shaft, gravitational forces may urge one or more of the pads into contact with the disc. At high disc speeds the frictional energy dissipated at the friction interface may cause unacceptable wear or degradation of the disc or pad.

The aim of the present invention is to provide an actuation system for a disc brake, wherein when the disc is in a released state, either or both friction pads can be prevented from contacting the disc friction faces under all conditions of shock and gravitational unbalanced forces.

According to the present invention there is provided a lever caliper type disc brake comprising a pair of pivotally mounted lever arms with an actuator arranged to act between said lever arms to cause the lever arms to pivot and apply the brake, an adjustable pad positioning device being connected to one lever arm to limit the available pivotal movement for said one lever arm when said actuator is in a brakes released position.

By virtue of the present invention the adjustable pad positioning device restricts the available movement for said one lever arm when the actuator is in the brakes released position so that the pad carried by said one lever arm is always held at a defined distance from the rotating disc in the brakes released condition. As the pad wears during its life, so the pad positioning device is adjusted to maintain the desired clearance in the brakes released condition.

As the lever arms are interconnected by the actuator, both the accurate positioning of the pad on said one lever arm, with respect to the disc, and the limiting of the available pivotal movement for said one lever arm, by said pad positioning device, normally ensures the required correct positioning of the other lever arm and the other pad to be achieved by means of the actuator incorporating a pad wear adjuster or a knock-back stop. Alternatively it may be preferable to have two independent pad positioning devices, one being connected to each lever arm.

A preferred embodiment of the present invention comprises a pair of lever arms pivotally mounted on the body of a vehicle. A friction pad is pivotally mounted on one end region of each lever arm, the pads being located on opposite sides of a rotatable disc. An actuator is mounted between the other end regions of the lever arms and a pad positioning device is pivotally connected both to an extension of the said other end region of one lever arm, and the body of the vehicle.

Alternatively, the pad positioning device may be connected to a lever arm at any desired point along the length of the lever arm provided it can control the pivotal movement available for the lever arm in the brakes released condition.

Preferably the pad positioning device comprises a hollow body attachable to the vehicle body with a piston and hollow piston rod axially movable within said hollow body, the piston and piston rod being biassed to an axially retracted position by a spring. The piston rod is pivotally connected to one of the lever arms and is coaxially located within a sleeve having an axially extending set of ratchet teeth on its outer surface, which teeth engage with a spring biased pawl or pin secured in the wall of the hollow body. Axial movement of the piston rod relative to the sleeve is limited by a lateral stop on the piston rod which can engage with an end of said sleeve. With the caliper adjusted for pad wear by a slack adjuster or knock-back stop in the actuator, the piston rod never moves sufficiently under normal braking to cause the lateral stop to engage the sleeve. Thus, in the brakes released position, the available pivotal movement for the lever arms is limited by the lateral stop and the sleeve; the design being such that the pads are always held clear of the disc in the brakes released condition. As pad wear occurs, so the lateral stop will engage the sleeve under normal braking, the braking forces moving the sleeve axially against the spring biassed pawl or pin. Thus the sleeve is adjusted for pad wear so that the pads are always maintained within the desired range of disc clearance in the brakes released condition. Two such pad positioning devices can be provided, if desired, one being connected to each lever arm.

A further embodiment of pad positioning device suitable for use in the present invention has a hollow body, piston and piston rod with sleeve, ratchet and pawl, as referred to hereabove. However, the spring is omitted. This pad positioning device is suitable for use, for example on an inclined drive shaft, gravitational forces taking the place of the previous spring force.

A still further embodiment of pad positioning device has an elongate member, i.e. rod, which is axially slidable in a sleeve fixed to the vehicle body, a resilient O-ring secured within the sleeve, gripping the rod and flexing to allow for normal braking movement. When pad wear adjustment occurs, the rod overcomes the frictional grip of the O-ring to slide through the O-ring to a new adjusted position.

The present invention thus provides a disc brake caliper wherein the pads are maintained clear of the disc at all times in the brakes released condition.

The present invention will now be further described, by way of example, with reference to the accompanying drawings, in which.

Figure 1:
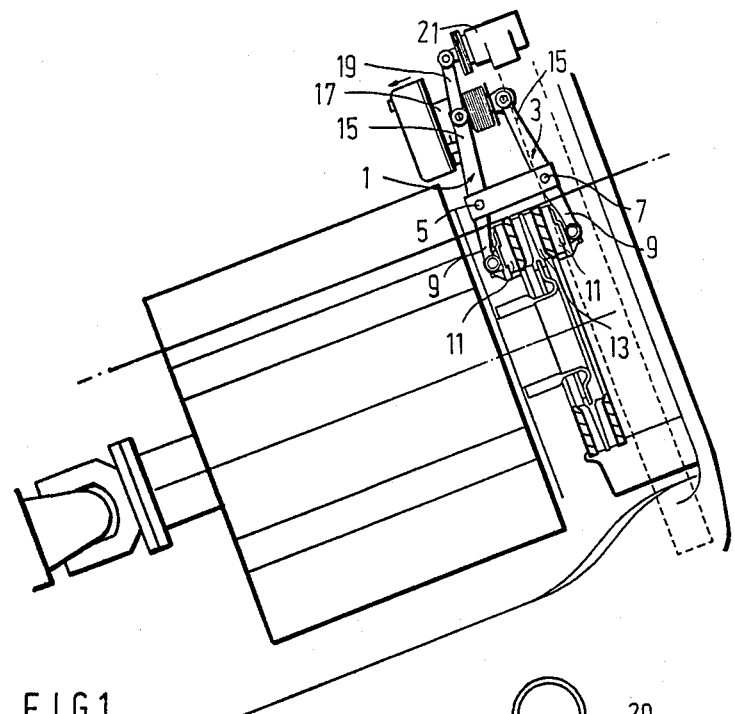
FIG. 1 is a schematic illustration of a lever-type caliper disc brake constructed according to the present invention.

The lever-type caliper disc brake illustrated schematically in FIG. 1 of the accompanying drawings and constructed according to the present invention, comprises a pair of lever arms 1, 3, each lever arm being pivotally mounted about a mid-region point 5, 7 on the vehicle body. One end region 9 of each lever arm 1, 3 pivotally carries a friction pad 11, the lever arms 1, 3 being so arranged that the friction pads 11 lie one on each side of the disc 13 of the brake. The other end region 15 of each lever arm 1, 3 is connected to a common actuator 17 incorporating a slack adjuster or knock-back stop to adjust for pad wear.

In normal operation the actuator 17 forces said other end regions 15 apart so that the lever arms 1, 3 pivot about said mid-region points 5, 7 to apply the friction pads 11 to the disc 13. With the basic conventional construction the lever arms 1, 3 can float, i.e. pivot, about the mid-region points 5, 7 so that one or other friction pad 11 can contact the disc 13 in the brakes released condition, especially in an inclined drive shaft arrangement. To overcome this problem the lever arm 1 in the embodiment of FIG. 1 has an axial extension 19 beyond the actuator 17, to which an adjustable pad positioning device 21 is pivotally attached, said pad positioning device 21 being also connected to the vehicle body. This pad positioning device 21 limits the pivotal movement available for lever arm 1 in the brakes released condition and thus limits the amount by which the pad 11 carried by lever arm 1 is maintained clear of the disc 13 in the brakes released condition. As the actuator 17, when normally adjusted for pad wear, interconnects the lever arms 1, 3 and maintains the desired pad clearance, the control of the lever arm 1 in the brakes released condition, by the pad positioning device 21, also controls the other lever arm 3 and thus holds both pads 11 clear of the disc 13. In an alternative embodiment of the present invention, a pad positioning device 21 can be provided for each lever arm 1, 3, so that the available pivotal movement for each lever arm 1, 3 in the brakes released condition,is controlled independently—see FIG. 3.

Further, whilst the pad positioning device 21 is shown in FIG. 1, as being attached to the lever arm extension 19, it can be alternatively secured to any point along the length of lever arm 1 provided it can control the pivotal motion of lever arm 1 about mid-region point 5.

Figure 2:
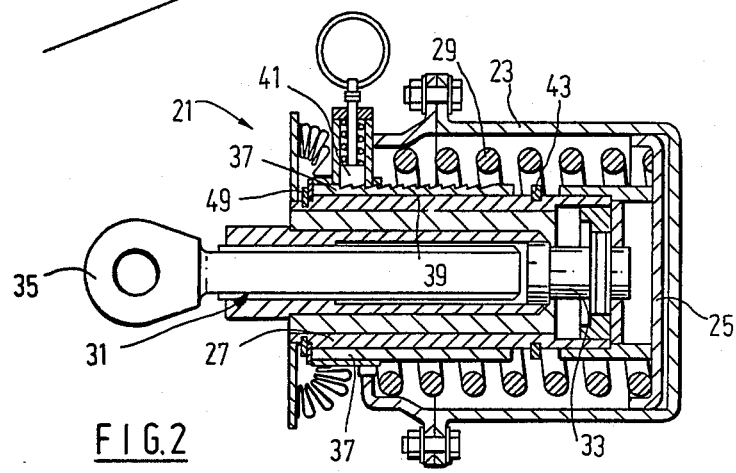
FIG. 2 is an axial cross-sectional view of one embodiment of adjustable pad positioning device suitable for use in the present invention.

A pad positioning device 21 is illustrated in FIG. 2 of the accompanying drawings. This pad positioning device 21 comprises a hollow cylindrical body 23 within which a piston 25 and hollow piston rod 27 are axially moveable. The piston 25 and hollow piston rod 27 are biassed to a retracted position within the cylindrical body 23, by a spring 29, a small diameter elongate piston rod extension 31 being located within the hollow piston rod 27 and projecting axially from the hollow piston rod 27. One end 33 of the piston rod extension 31 is pivotally secured within the piston rod 27 and the other end 35 is pivotally attachable to lever arm 1. A cylindrical sleeve 37 is axially slidably located on the piston rod 27, and has an elongate region of ratchet teeth 39 which are engaged by a spring biassed pawl 41 mounted on the body 23. The pawl 41 thus maintains the axial position of the sleeve 37 relative to the body 23. Mounted on the piston rod 27 is a lateral stop 43, e.g. a circlip, which can engage the end of the sleeve 37 should the piston 25 and piston rod 27 be moved a sufficient extent axially of the cylindrical body 23. In use, in the brake of FIG. 1, the piston 25 and piston rod 27 will be moved against the spring 29 by normal braking, though assuming that the actuator 17 has adjusted the pad clearance to cater for pad wear, the lateral stop 43 will not engage the sleeve 37 in the pad positioning device 21. In the brakes released condition, the pad 11 connected to lever arm 1 is retracted from contact with the disc 13 by the spring 29. Excess retraction is prevented by a lateral stop 49, e.g. a circlip, engaging the sleeve 37 which is itself restrained by virtue of the ratchet teeth 39 engaging the pawl 41. Any caliper float, i.e. about pivot points 5, 7, is prevented by the spring 29. In the event of excessive pad wear, normal braking will cause the lateral stop 43 to press against the sleeve 37 and move the sleeve 37 over the pawl 41 to adjust the limit position to which stop 49 returns in the brakes released condition. Thus the retraction of pad 11 connected to lever arm 1, is controlled; the shock adjuster or knock-back stop in the actuator 17 adjusting the total pad clearance, i.e. the sum of the two pad clearances, and hence the retraction of pad 11 connected to lever arm 3.

Figure 3:
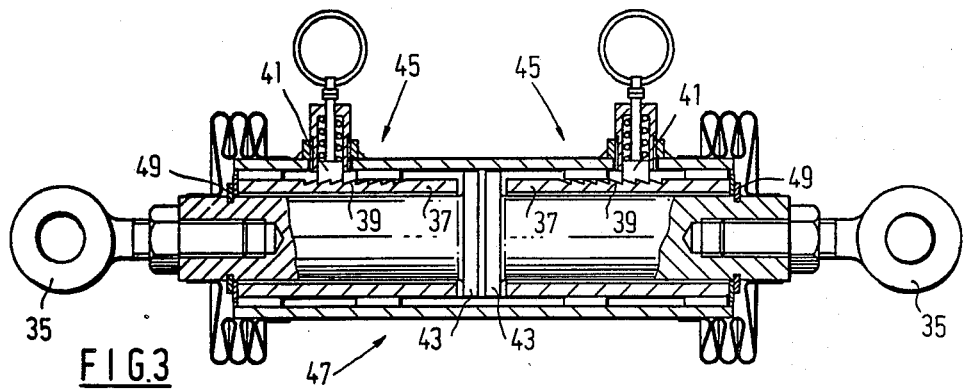
FIG. 3 is an axial cross-sectional view through a unit incorporating two modified pad positioning devices.

Two identical modified pad positioning devices 45 are illustrated in FIG. 3 of the accompanying drawings, in an integral unit 47; it being the intention to secure each pad positioning device 45 to a different lever arm 1, 3. The only difference in the pad positioning device of FIG. 3 from that of FIG. 2, is that the spring 29 is omitted. When this modified device is used, the slack adjuster or knock back stop in actuator 17 maintains the total pad clearance between the two pads 11 and the disc 13, i.e. the sum of the two clearances, and the positioning devices 45 then equalise the available total clearance between each pad 11 and the disc 13.

In a further embodiment of the present invention (not illustrated) a single positioning device 45 is used, the single device 45 being arranged in such a manner that gravitational forces replace the function of spring 29 in retracting the pad 11 connected to lever arm 1.

Another embodiment of pad positioning device (not shown) suitable for use in the present invention, comprises an elongate rod attachable to a lever arm of the caliper, the elongate rod extending through a resilient O-ring secured in a member attached to the vehicle body. The O-ring grips the rod and flexing of the O-ring controls float of the lever arms 1, 3 and allows for normal braking. With excessive pad wear the rod is moved with sufficient force to overcome the frictional grip of the O-ring, i.e. by the normal braking forces. Thus the pad positioning device is adjusted.

The present invention thus simply provides a lever type caliper disc brake wherein pad float is limited and pad clearance maintained in the brakes released condition.

We claim:

1. A lever caliper type disc brake comprising a pair of lever arms each being adapted to be pivotally mounted on a vehicle body about a mid-region point of said lever arm, an actuator arranged to act between said lever arms to cause the lever arms to pivot and apply the brake, an adjustable pad positioning device being connected to one lever arm and, in use, to a fixed point to limit the available pivotal movement for said one lever arm when said actuator is in a brake released position.

2. A disc brake according to claim 1, wherein the lever arms each carry a friction pad, the pad positioning device restricting the available movement of said one lever arm so that the pad carried by said one lever arm is always held at a defined distance from the disc of the brake in the brakes released position.

3. A disc brake according to claim 1, wherein the actuator interconnects the lever arms on one side of the respective pivot points of said lever arms, and friction pads are carried by said lever arms on the other side of said respective pivot points.

4. A disc brake according to claim 3, wherein the lever arms are pivotally mounted on the body of a vehicle with the friction pads located on opposite sides of a rotatable disc, the pad positioning device being connected to said one lever arm and to the body of the vehicle.

5. A disc brake according to claim 4, wherein the pad positioning device is connected to an extension of said one lever arm.

6. A disc brake according to claim 1, wherein two independent pad positioning devices are provided, one being connected to each lever arm.

7. A disc brake according to claim 1, wherein the pad positioning device comprises a hollow body with a piston and hollow piston rod axially movable within said hollow body, the piston rod being pivotally connected to a lever arm and being coaxially located within a sleeve having an axially extending set of ratchet teeth in its outer surface, which teeth engage with a spring-biased member secured to the hollow body.

8. A disc brake according to claim 7, wherein axial movement of the piston rod relative to the sleeve is limited by a stop on the piston rod which can engage with an end of said sleeve.

9. A disc brake according to claim 7, wherein the piston and piston rod are biased towards an axially retracted position in the hollow body, by a spring

* * * * *